Dec. 29, 1936.    G. L. KNOX    2,065,924

RUNNING GEAR

Filed Nov. 25, 1935    2 Sheets-Sheet 1

INVENTOR.
Garner L. Knox
By Lyon & Lyon
ATTORNEYS

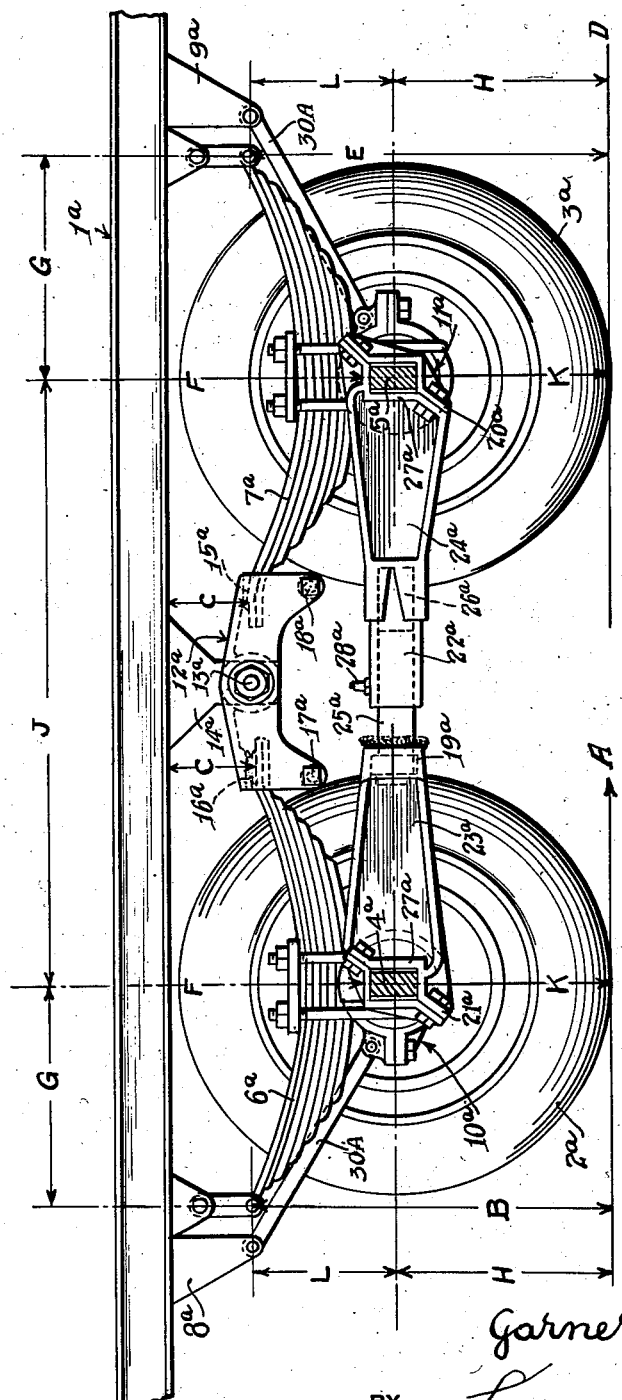

Patented Dec. 29, 1936

2,065,924

UNITED STATES PATENT OFFICE 2,065,924

RUNNING GEAR

Garner L. Knox, Glendale, Calif., assignor to Utility Trailer Manufacturing Company, Los Angeles, Calif., a corporation of California Application November 25, 1935, Serial No. 51,351

3 Claims. (Cl. 280—104)

This invention relates to running gears, and more particularly to a motor vehicle running gear of the multiple axle type as is commonly employed for the distribution of the load carried by the motor vehicle over a multiplicity of wheels at the rear of the motor vehicle frame.

One of the chief difficulties which is encountered in the designing of load equalized dual axle suspension running gears is to maintain equalization of the load distribution under driving or braking torque. It is an object of my invention to provide a running gear which is economical to build and maintain, and wherein the running gear is suspended from the frame at three points upon each side of the frame and wherein there is provided a torque means between the axles of the running gear for maintaining of balance of load distribution under driving or braking torque.

Other objects and advantages of this invention it is believed will be apparent from the following detailed description of a preferred embodiment thereof as illustrated in the accompanying drawings.

In the drawings:

Figure 5 is a view similar to Figure 2 but showing a modified form thereof wherein radius rods 30a and 31a are provided for relieving the spring of the torque reactions.

Figure 1:
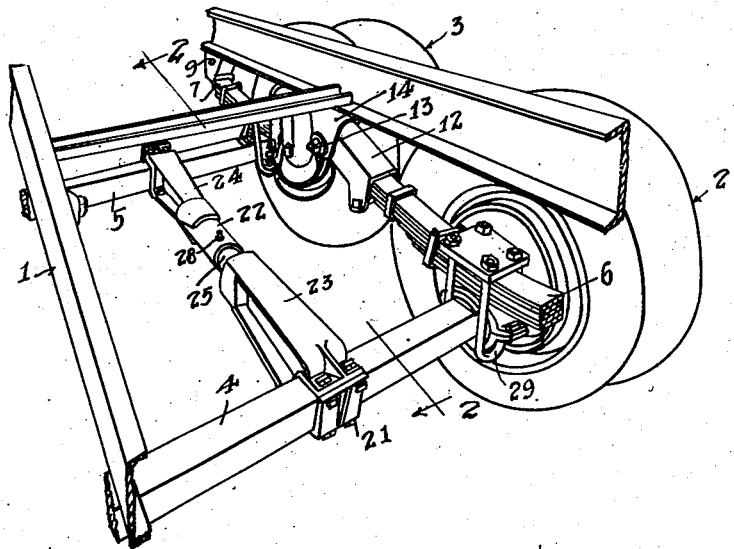
Figure 1 is a fragmental perspective view illustrating the running gear embodying my invention.

In the preferred embodiment of my invention illustrated in the drawings, I indicates a frame of a motor vehicle, truck, trailer, or the like, which frame is supported at one end by forward and rearward wheels 2 and 3 positioned upon opposite sides of the frame I. The wheels 2 and 3 are mounted upon axles 4 and 5. The frame I is supported upon the axles 4 and 5 upon springs 6 and 7. The opposed outer ends of the springs 6 and 7 are connected to the frame I by means of spring hangers 8 and 9 which may be of any suitable or desirable construction.

Figure 2:
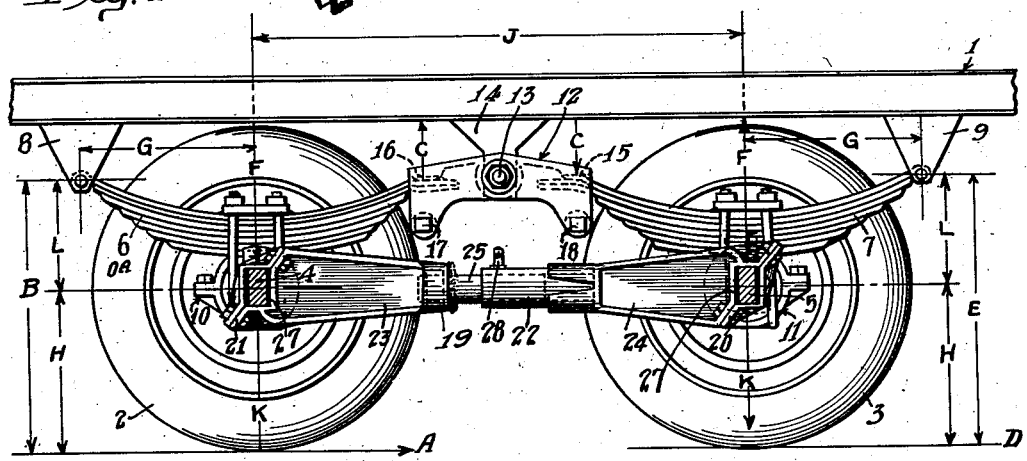
Figure 2 is an elevation thereof taken on line 2—2 of Figure 1.
Figure 3:
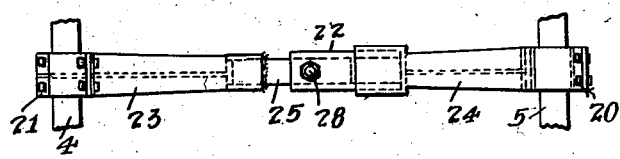
Figure 3 is a detached plan view of the torque arm embodied in my invention.
Figure 4:
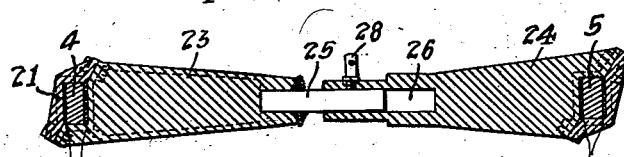
Figure 4 is a sectional elevation of the torque arm illustrated in Figure 3.

In an alternate form of construction diagrammatically illustrated in Figure 5 wherein the several parts corresponding to those shown in Figure 2 have been given the same number with the letter "a" added thereto. In this alternate form of my invention ends of the springs 6ª and 7ª are free to move longitudinaly and radius rods 30ᴬ extend from the axles 4ª and 5ª to suitable brackets 31ᴬ on the frame Iª. As this modified form of construction is adapted to my invention in the same way, this description will hereafter be confined to the fixed spring form.

At points substantially midway of their length, the springs 6 and 7 are secured by journals 10 and 11 to the axles 4 and 5 upon opposite sides of the frame I. Prior to my invention in this type of construction, the springs 6 and 7 were secured directly to the axles 4 and 5 by the clips 29. The springs 6 and 7 are connected together for the purpose of load distribution between the wheels 2 and 3 by means of a rocker arm 12 which is pivotally mounted upon a pivot 13 of a rocker arm bracket 14 secured to the frame I. The inner adjacent ends of the springs 6 and 7 pass within the hollow casting forming the rocker arm 12 and frictionally engage pressure pads 15 and 16 formed within the hollow casting of the rocker arm 12. Retaining pins 17 and 18 act to retain the ends of the springs in position during operation.

With this type of construction there is provided a three-point suspension of the running gear from the frame I, or a three-point support for the frame I upon the running gear. The disadvantage of this construction as thus described results from the fact that when brakes are applied to the wheels 2 on the axle 4, a force A acts through a lever arm B resulting in an upward force C on one end of the rocker arm. At the other end of the rocker arm an equal force C presses down on the ends of the springs of axle 5. The forces C are balanced by forces F acting upon arms G.

From this analysis it is evident that the force A, due to the braking action on the wheels of the axle 4, reduces the load on the wheels of the axle 4 and increases the load on the axle 5. The force D, due to the braking action on the axle 5, acts through a lever arm E and is balanced by forces F acting through arms G. Here again the braking force results in increased load on the wheels of the axle 5 and decreased load on the axle 4.

In order to overcome this difficulty of load distribution, I have found that by incorporating in the running gear a torque arm 19 properly related to the axles 4 and 5, an equalization of load may be maintained between the wheels 2 and 3, or on the axles 4 and 5 under driving or braking torque. With this torque arm 19 installed between the axles 4 and 5, the springs 6 and 7 are mounted on journals 10 and 11 so that the axles 4 and 5 are free to rotate relative to the springs 6 and 7.

In order to obtain equal load distribution, the torque arm 19 is connected between the axles 4 and 5 in such a way that the upward and downward forces imposed upon the two axles 4 and 5 due to the braking action upon the wheels 2 and 3 offset each other or are equal. This result is accomplished when the dimensions are such that twice the distance G times the distance H is equal to the distance L times the distance J, that is, where twice the horizontal distance from the axis of the pin of the spring hanger 9 to a plane passed vertically through the axis of the axle 5 times the height of the axis of the axle 5 from the roadway is equal to the distance vertically of the axis of the axle 5 from the axis of the pivot pin of the hanger 9 times the distance between the axes of the two axles 4 and 5.

From the drawings it will be seen that AH is equal to JK, and that AL is equal to 2FG, and therefore $$\frac{JK}{H}$$

is equal to $$\frac{2FG}{L}$$

and by substitution that K is equal to $$\frac{2FGH}{LJ}$$

Therefore, if the force K equals the force F, then 2G times H is equal to L times J.

The torque arm 19 is connected at the midpoint of axles 4 and 5 transversely of the frame 1 by means of brackets 20 and 21, and is formed to provide for a slip joint 22 between the axles 4 and 5 by any suitable means such, for example, as by forming the torque arm 19 of the two castings 23 and 24 which are secured to the respective axles by means of clamps 20 and 21.

To the casting 23 is secured a cylindrical extension 25 which fits within an elongated cylinder bore 26 formed in the casting member 24. The cylinder 25 is secured to the casting 23 by welding or any suitable means.

The opposite end of the cylinder 25 is free to slide within the elongated bore 26 formed in the casting 24. In order to provide for the free movement, a grease fitting 28 may be provided. Means are provided to permit slight angular movement between the torque arm and the axles. One way of accomplishing this is to position rubber pads 27 between the vertical sides of the axles and the torque arm.

With this construction as thus assembled, when a braking force is applied to the wheels 2, the force A first acts through the lever arm H and is resisted by the torque arm 19 with forces K acting as a couple through the lever arm J. This results in the force A being transmitted to the center line of the axle and at the same time the axle 5 is lifted by a force equal to K and axle 4 is pressed down by an equal force. This transferred force A now acts through the lever arm L and as in the construction without the torque arm, is resisted by the forces F acting through lever arms G. Thus the force A produces an upward and downward force on both axles 4 and 5. By a similar analysis, the force D results in an upward and downward force on both the axles 4 and 5. Thus when the dimensions as herein set forth are maintained, the upward and downward forces offset each other so that equal distribution of load of the driving wheels 2 and 3 is maintained under braking or driving torque.

Having fully described my invention, it is to be understood that I do not wish to be limited to the details herein set forth, but my invention is of the full scope of the appended claims.

I claim:

1. In a running gear, the combination of a frame, spaced axles for supporting one end of the frame, supporting wheels mounted upon the axle, springs journaled substantially midway of their length on each axle and upon each side of the frame, pivoted rocker arms for operatively connecting the adjacent ends of the springs, means connecting the outer ends of the springs with the frame, and a torque arm connecting the axles together at a point substantially midway of the length of said axles, the relative positions of said combination being such that the distance between the axles times the distance vertically of the axles from the point of connection of the springs with the frame is substantially equal to twice the horizontal distance of the point of connection of the fixed ends of the spring with the frame to the axle times the height of the axles from the roadway.

2. In a running gear, a frame, spaced wheel carrying axles for supporting one end of the frame, springs journaled substantially midway of their length on each axle, pivoted rocker arms operatively connecting the adjacent ends of the springs, means connecting the outer ends of the spring with the frame in such manner as to permit a limited motion of the spring ends relative to the frame, radius rods connecting each axle with the frame, and a torque arm connecting the axles, the relative positions of said combination being such that the distance between the axles times the vertical distance from the axles to the point of connection of the radius rod with the frame is substantially equal to twice the horizontal distance taken from the axle to the point where the outer end of the spring supports the frame times the height of the axle from the roadway.

3. In a running gear, a frame, spaced axles for supporting one end of the frame, springs journaled on the axles, means connecting the outer ends of the springs with the frame, a load distributing rocker arm pivotally mounted with relation to the frame and connecting the inner adjacent ends of the springs, and a torque arm connecting the spaced axles, the relative positions of this combination being such that the distance between the axles times the vertical distance from the axles to the point of connection of the spring with the frame is substantially equal to twice the horizontal distance taken from this point of connection of the spring with the frame to the axle times the height of the axle from the roadway.

GARNER L. KNOX.